July 28, 1970 L. W. SANDOW 3,521,658
FLUID PRESSURE REGULATOR
Filed Jan. 16, 1968
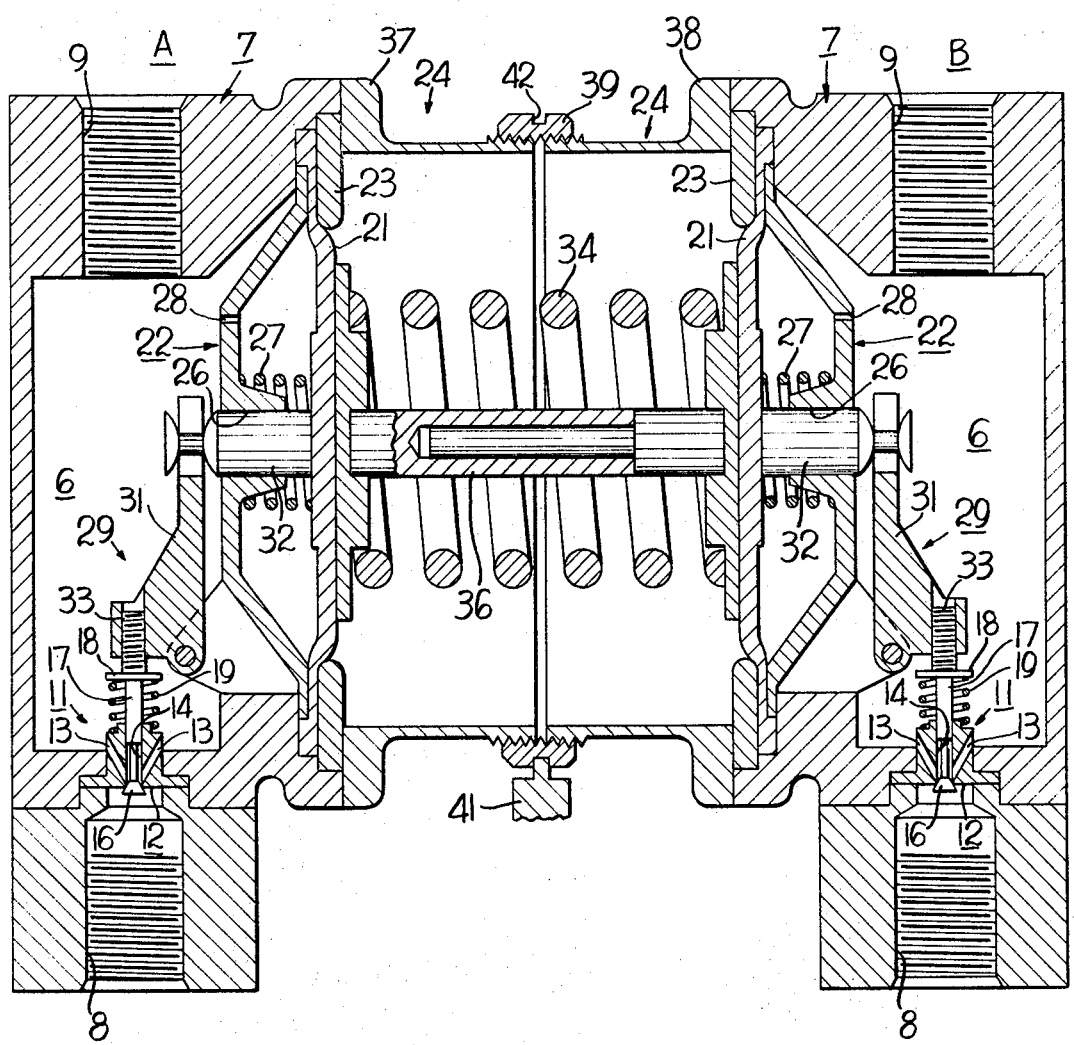
Inventor
Louis W. Sandow
By John P. Hines
Attorney

United States Patent Office 3,521,658
Patented July 28, 1970

3,521,658
FLUID PRESSURE REGULATOR
Louis W. Sandow, Milwaukee, Wis., assignor to Allis-Chalmers Manufacturing Company, Milwaukee, Wis.
Filed Jan. 16, 1968, Ser. No. 698,207
Int. Cl. G05d 11/03
U.S. Cl. 137—100
1 Claim

ABSTRACT OF THE DISCLOSURE

A fluid pressure regulator for regulating the pressure of two separate fluids. The regulator compensates for changes in the pressure of either fluid to maintain the pressure differential constant.

---

This invention pertains to fluid pressure regulators in general and more particularly to a pressure regulator capable of maintaining the pressure of two independent fluids at the same level.

The invention described herein was made in the performance of work under a NASA contract and is subject to the provisions of Section 305 of the National Aeronautics and Space Act of 1958, Public Law 85–568 (72 Stat. 435; 42 U.S.C. 2457).

Many processes require independent or separate fluids to be delivered to the process at the same pressure or at a constant pressure differential. The process may be workable over a range of different pressure levels so long as the pressure deviation is the same for each of the independently supplied fluids. It is therefore the general object of this invention to provide a pressure regulator capable of maintaining a constant pressure differential between separate fluids.

A more specific object of the subject invention is to provide a pressure regulator of the hereinbefore described type wherein the pressure regulator will accommodate changes in the pressure of each fluid but maintain the same pressure relationship between all fluids.

A more specific object of the subject invention is to provide a pressure regulator of the hereinbefore described type wherein two pressure regulating devices are connected together by a pressure sensitive member which causes a pressure changing reaction in one device due to a pressure change in the other device.

These and other objects of the subject invention will become more fully apparent as the following description is read in light of the attached drawing wherein:

The figure is a cross sectional view of a fluid pressure regulator constructed in accordance with the invention.

Referring to the patent drawing, the invention comprises two independent and identical regulating devices A and B. Since both these devices A and B are identical, a description of only one device will be made, although identical reference characters will be applied to both devices.

Again referring to the drawing, a pressure regulating chamber 6 is defined by the walls of the device housing 7. A fluid inlet passage 8 and a fluid outlet passage 9 are both provided in the walls of the housing. The inlet passage 8 is adapted for connection to a source of pressurized fluid (not shown) and the outlet passage is adapted for connection to the work (not shown). Since the work requires a pressurized fluid, the pressure of the fluid at the work is indicated in the chamber 6.

Valve means in the form of a poppet valve generally designated 11 is provided in the inlet passage 8. The poppet valve may be constructed in any conventional manner and is herein shown as including a plug generally designated 12 with fluid passages 13 and a valve bore 14. A poppet 16 having a stem 17 connected thereto is slidably received within the bore 14. The stem 17 extends through the bore into the interior of the chamber 6, and is provided with a spring support or disk 18 at its inner end. A coil spring 19 is positioned about the stem 17, seating against the disk 18 and a surface of the plug 12. In this manner the spring 19 biases the poppet 16 into fluid sealing engagement with a seat provided in the plug 12.

One wall of the housing 7 is formed by a flexible diaphragm 21. This diaphragm is connected to the housing 7 in any conventional manner so as to provide a fluid tight engagement therewith. A diaphragm support generally designated 22 is also rigidly connected to the housing 7. As herein shown for purposes of illustration, the diaphragm and diaphragm support are both held in position by means of a support ring 23 which is forced against the housing 7 by an intermediate housing 24, the importance of which will be explained later. The diaphragm support 22 is spaced from the diaphragm and is provided with a bore 26 therethrough which is in substantial alignment with the geometric center of the diaphragm 21. Resilient compression means in the form of a limiting coil spring 27 is operatively positioned between and engages both the diaphragm 21 and the diaphragm support 22. This limiting spring 27 resists movement of the diaphragm toward the diaphragm support 22. Any means may be provided to insure that the fluid pressure in the chamber 6 is impressed on the diaphragm 21 and to this end at least one port 28 is provided through the diaphragm support into the space between it and the diaphragm.

Motion transmitting means generally designated 29 are provided to transmit movement of the diaphragm 21 to the poppet valve 11. To this end and for purposes of illustration, the motion transmitting means are shown as a stub shaft 32 and a lever 31 pivotally connected to the housing 7. The stub shaft is slidably contained in the bore 26 of the diaphragm support 22 and one end is in contact with the diaphragm 21. The other end of the stub shaft 32 is pivotally connected to the free end of the lever 31. The other end of the lever 31 has an internally threaded bore which receives an externally threaded bolt 33. The bolt 33 is movable to adjust its position relative to the disk 18 at the end of the poppet stem 17. As shown in the patent drawing, movement of the stub shaft 32 to the left causes the lever 31 to force the poppet 16 from its seat. Movement in the opposite direction removes the bolt 33 from engagement with the poppet stem disk 18, permitting the spring 19 to return the poppet to its seat.

The intermediate housing 24 connects the two regulating devices A and B together. One surface of each diaphragm 21 is exposed to the interior of the intermediate housing 24. A resilient compression means in the form of a reference coil spring 34 is in engagement with each diaphragm and urges both diaphragms away from one another. For mechanical stability, a telescoping shaft 36 is also provided between the spaced surfaces of the diaphragms 21. The telescoping shaft may be constructed in any conventional manner to permit relative axial movement between the shaft halves.

The operation of the pressure regulator will now be described. The reference spring 34 exerts a pressure on both diaphragms 21 causing the poppet valves to open because of the connection with the motion transmitting means. Pressurized fluid is permitted to enter the chambers 6 and pass through the outlet 9 to the work. As pressure in the chambers rise, they approach a predetermined magnitude which when acting on the surfaces of the diaphragms exert a force equal to or greater than the force of the spring 34. This causes a compression of the spring 34 permitting the poppet valves to close. As both pressures in the devices A and B rise and fall together, the poppet valves 11 will open and close under the control of the reference spring 34. The reference spring 34 will remain in the same relative position but will expand and be compressed as the two pressures fluctuate together.

When the pressure in device B falls below the pressure in device A, the reference spring will move bodily to the right under the urging of the diaphragm 21 in the device A. This will cause the poppet valve in the device B to open and close the poppet valve in the device A. The poppet valve in device B will remain open until that pressure has equalized the pressure in device A, at which time the reference spring 34 will move to the left to the central or balanced position between both diaphragms.

In the event there is a complete pressure failure, as for instance in device B, the reference spring 34 will move to the right, opening the right poppet valve and closing the left poppet valve. In this position no fluid will be delivered to the work. The pressure regulator will remain in this condition until there is a lowering of the pressure in the device A or until the fluid pressure in the device B increases to balance the pressure in the device A. The coil spring 27 is provided between the diaphragm 21 and the diaphragm support 22 in order to center the reference spring 34 during initial adjustment of the regulator and also serves as a means of effectively damping induced mechanical vibration within the regulator. This coil spring limits the amount of movement of the diaphragms due to an unbalance of pressure in either device and the force exerted by the reference spring 34.

It may be desirable to adjust the force exerted by the reference spring 34. To this end the intermediate housing 24 is divided into two half sections 37 and 38. Each half section has a threaded portion on its adjacent outer peripherial surface. These threaded surfaces have opposite hand threads. A nut 39 having an internal thread complementary to the threaded surfaces is engaged therewith. This nut is permitted to rotate; however, it is held against longitudinal movement, in any conventional manner such as by a stationary flange 41 slidably contained within an annular groove 42 in the outer surface of the nut. As the nut is turned, the intermediate housings 37 and 38 either move closer together thereby increasing the force exerted by the reference spring, or move further apart thereby decreasing the force exerted by the reference spring.

Although only one embodiment of the subject invention has been herein shown and described, other embodiments will be apparent to those skilled in the art after reading this description and all such embodiments as come within a reasonable interpretation of the appended claim are intended to be convered.

The embodiments of the invention in which an exclusive property or privilege is claimed are defined as follows:

1. A dual flow fluid pressure regulator comprising: walls defining independent first and second fluid pressure chambers each with an inlet and an outlet fluid passage; a fluid valve in each inlet passage mounted for movement between open and closed positions to permit and interrupt the flow of pressure fluid to its respective chamber; a fluid pressure responsive means for each fluid chamber exposed to the pressure fluid in its respective chamber, said fluid pressure responsive means being movable upon the attainment of a predetermined fluid pressure in its respective chamber; means connecting each of said fluid pressure responsive means and its respective valve in motion transmitting engagement to open and close said valves as a result of predetermined movement of said pressure responsive means; reference biasing means engaging both of said fluid pressure responsive means and exerting a predetermined force thereon equal to and opposite to the force exerted by said pressure responsive means as a result of said predetermined fluid pressure being attained in said fluid chambers; a two part intermediate housing connecting the walls of said first and second chambers; and adjusting means connecting the two parts of said intermediate housing, said adjusting means being adjustable to move said intermediate housing parts to increase and decrease the force exerted by said reference biasing means on said pressure responsive means.

References Cited

UNITED STATES PATENTS

| 1,798,317 | 3/1931 | Eaton | 137—100 |
| 2,858,845 | 11/1958 | Ensign | 137—505.46 |
| 3,324,872 | 6/1967 | Cloud | 137—98 |

FOREIGN PATENTS

| 782,132 | 3/1935 | France. |

WILLIAM F. O'DEA, Primary Examiner

H. M. COHN, Assistant Examiner

U.S. Cl. X.R.

137—505.43